July 14, 1970  F. W. ROGERS  3,520,571
FORKLIFT TRUCKS
Filed Dec. 24, 1968  3 Sheets-Sheet 1
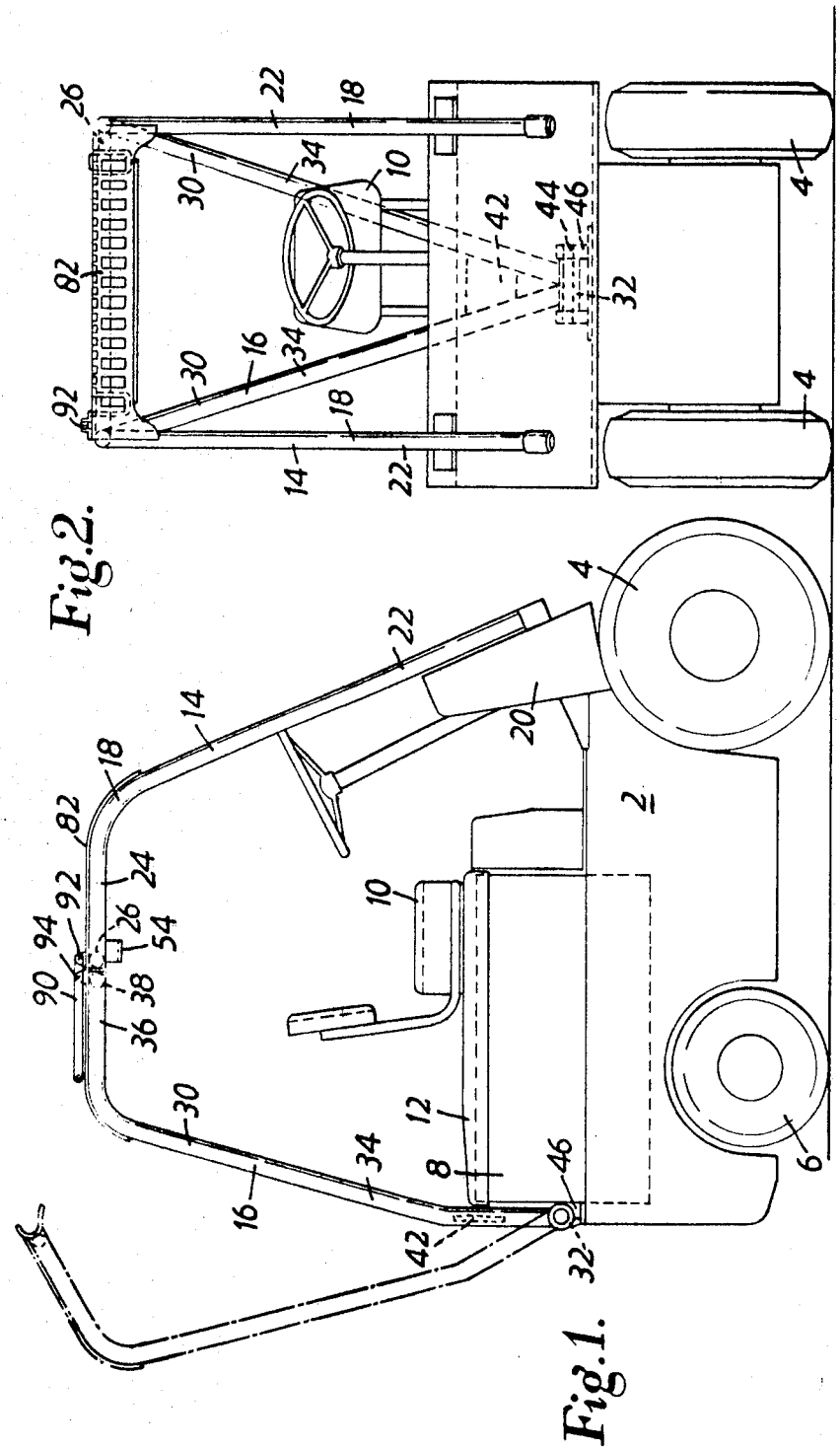
INVENTOR
Frank William Rogers
By
ATTORNEY INVENTOR
Frank William Rogers
BY
ATTORNEY July 14, 1970  F. W. ROGERS  3,520,571
FORKLIFT TRUCKS Filed Dec. 24, 1968  3 Sheets-Sheet 3

INVENTOR
Frank William Rogers
By Ira Milton Jones
ATTORNEY

United States Patent Office 3,520,571
Patented July 14, 1970

3,520,571
FORKLIFT TRUCKS
Frank W. Rogers, Ipswich, Suffolk, England, assignor to Ransomes Sims & Jefferies Limited, Ipswich, Suffolk, England, a British company
Filed Dec. 24, 1968, Ser. No. 786,689
Claims priority, application Great Britain, Dec. 28, 1967, 58,969/67
Int. Cl. B62d 25/06
U.S. Cl. 296—102
8 Claims

ABSTRACT OF THE DISCLOSURE

A canopy guard for a battery powered forklift truck comprises two frame parts each of which, in operation, is connected at its lower end to the truck and has at its upper end a portion of the shield of the guard, the frame parts being releasably connected together at their upper ends. At least one of the frame parts is hinged so that, upon release of the connection between the two frame parts, it can be swung away from the other frame part to allow of removal of the battery from the truck by means of an overhead hoist.

---

This invention relates to a canopy guard for a forklift truck, that is to say a guard comprising a shield supported in use, over the truck driver's position, on a frame fixed to the truck at respective spaced locations thereof, the shield being positioned in operation to protect the driver of the truck from falling objects.

A disadvantage of this type of guard when fitted to a battery powered fork lift truck has been the difficulty of removing the battery from the truck by means of an overhead hoist without first completely removing the guard, which in itself is a difficult operation because of the weight of the guard itself.

According to this invention there is provided a canopy guard of the kind set forth, in which the guard comprises two frame parts each including a shield portion one side of which is disposed at one end of the frame part and, when the guard is in an operative position on the truck, is opposed to a corresponding side of the shield portion of the other frame part, the two shield portions then forming the shield of the guard, each frame part being adapted at its end remote from the shield portion for connection to the truck and at the said one end for releasable interlocking connection to the other frame part when the guard is in its operative position, at least one of the frame parts being adapted at or near the end remote from the shield portion for hinged connection to the truck, so that, upon release of the interlocking connection between the frame parts the or each hinged frame part can be swung away from the other frame part to allow of removal of the battery from the truck by means of an overhead hoist.

Preferably, the frame parts are so adapted that when the guard is in its operative position, a downwardly directed load applied to the shield of the guard will urge the or each hinged frame part towards the other frame part.

It will be apparent that, with a forklift truck fitted with a canopy guard according to the invention, in order to remove the battery it is necessary simply to release the connection between the frame parts and swing the or each hinged frame part away from the other part to allow a hoist to be lowered from above to lift the battery from its casing and move it away from the truck between the frame parts. Since the or each hinged frame part has only to be moved sufficiently to allow the hoist to be lowered the removal of the battery can take place in a restricted space.

One embodiment of the invention will now be described, by way of example, with reference to the accompanying drawings, in which:

FIG. 1 is a somewhat diagrammatic side elevational view of the body of a forklift truck fitted with a canopy guard according to the invention.

FIG. 2 is a front elevational view of the truck body and guard of FIG. 1.

Figure 3:
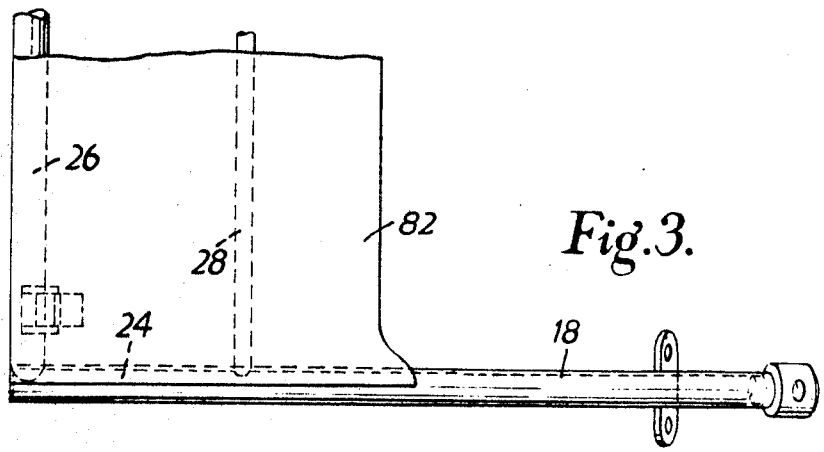
FIG. 3 is a fragmentary plan view of the front section of the canopy guard of FIGS. 1 and 2.

Referring to FIGS. 1 and 2, a canopy guard is fitted to a battery-powered, masted forklift truck of conventional design, having a body 2 mounted on front driving wheels 4 and rear driven wheels 6, a mast (not shown) fixed at the front end of the body and supporting a fork carriage (not shown) movable lengthwise of the mast, a battery casing 8 mounted on the body towards the rear thereof, and a driving seat 10 positioned on a forward part of a lid 12 of the battery casing which lid is removable to allow removal of the battery from the casing.

The canopy guard includes a front frame section 14 and a rear frame section 16. The front frame section 14 comprises two similar parallel bars 18 of tubular metal, fixed at their lower ends, as by bolts, to respective opposite sides of a front cowling 20 of the truck body disposed immediately behind the mast position, each bar 18 being thus fixed near a forward corner of the truck body. Each bar 18 has a rearwardly inclined, upwardly extending portion 22 continuing through a smooth curve into a rearwardly extending horizontally disposed portion 24, and the rear ends of the latter portions are connected by a cross-bar 26 of similar tubular metal extending horizontally at right angles to the horizontally disposed portions 24 and welded to them at its ends. A bracing strut 28 (see FIG. 3) connects the horizontally disposed portions towards their forward ends.

The rear frame section 16 of the guard comprises two bars 30 of tubular metal the lower ends of which are welded at adjacent positions to a short, horizontally disposed hinge tube 32. The pair of bars 30 diverges from the hinge tube, each bar having a portion 34 which in an operative position of the section is upwardly and outwardly inclined and continues through a smooth bend into a horizontally disposed forwardly extending portion 36. The forwardly extending portions 36 are parallel, and, when the rear section 16 of the guard is in its operative position as explained below, are coaxial with the rearwardly extending portions 24 of the bars 18 of the front section 14 of the guard. The forward ends of the horizontally disposed portions 36 are connected by a cross-bar 38 of similar tubular metal extending at right angles to the horizontally disposed portions and welded to them at its ends. A strut 40 (see FIG. 4) connects the horizontally disposed portions 36 near their rear ends and a gusset plate 42 is welded in position between the bars near their junctions with the hinge tube 32.

The hinge tube 32 is carried freely on a shaft 44 mounted at its ends in respective apertures of lugs of a bracket 46 on the truck body immediately behind the battery casing 8, the axis of the shaft 44 being horizontal and at right angles to the normal line of movement of the truck.

Figure 4:
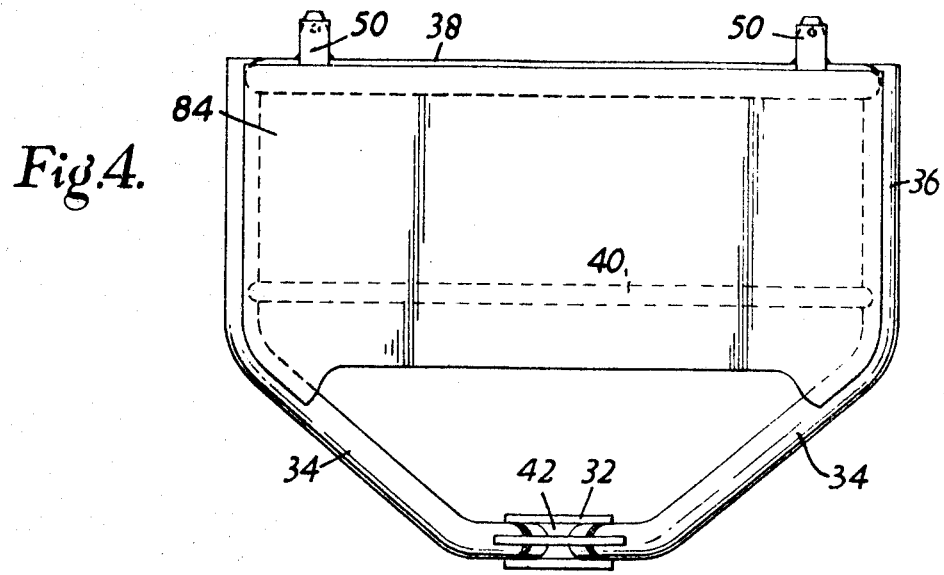
FIG. 4 is a plan view of the rear section of the guard of FIGS. 1 and 2.
Figure 5:
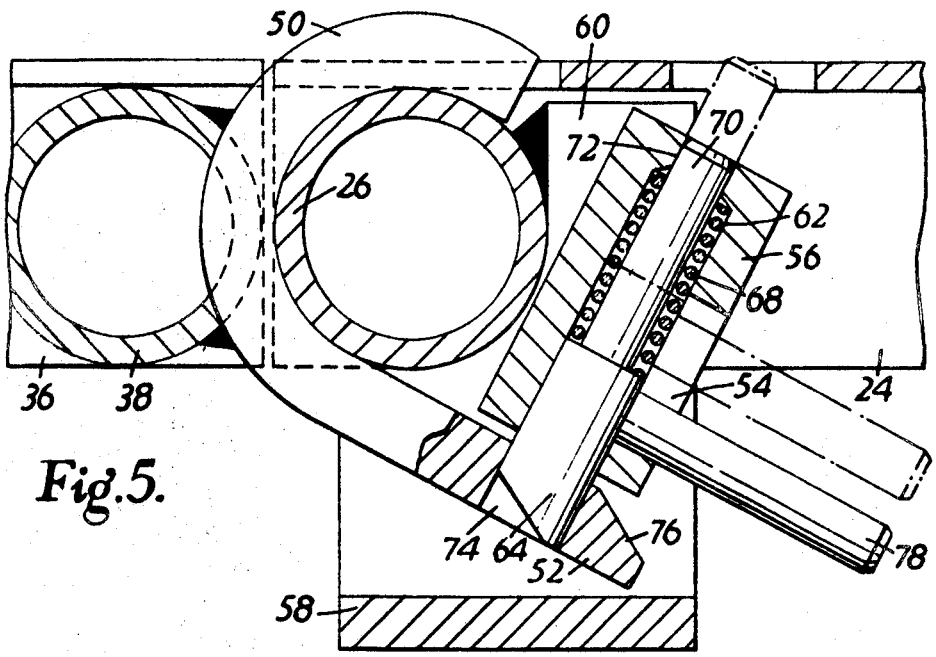
FIG. 5 is a side elevational view of the latching device of the guard of the previous figures.
Figure 6:
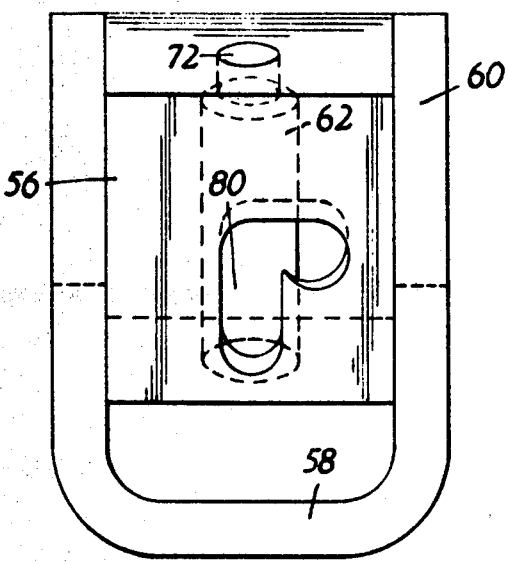
FIG. 6 is a front elevational view of part of the latching device of FIG. 5, with some parts omitted for clarity.

As shown in FIGS. 4 and 5, at each of two axially spaced positions on the cross-bar 38 of the rear frame section 16 is fixed a half-cylindrical member 50 of inner diameter equal to or a little greater than the outer diameter of the cross-bar 26 of the front frame section 14 of the guard and so positioned that on pivoting the rear section 16 about its hinge to its operative position the half cylindrical member 50 hooks over the cross-bar 26 of the front frame section 14. The lower part of each half-cylindrical member 50 is extended to form a latch member 52 which co-operates with a latching device 54 fitted to the front cross-bar 26, the latch member 52 being inclined forwardly and downwardly when the rear frame section 16 is in its operative position. Each latching device 54 comprises a housing 56 mounted at the forward side of the cross-bar 26 of the front frame section by means of a generally upright U-shaped member 58, the housing 56 being secured between the upright arms 60 of the U-shaped member, which arms are of substantial width and are shaped so as to fit against the forward side of the cross-bar 26 to which they are welded. The housing 56 is formed with a bore 62 and is so positioned in the U-shaped member 58 that the axis of the bore 60 is forwardly inclined so as to be perpendicular to the co-operating latch member 52 on the cross-bar 38 of the rear frame section 16 when the latter is in its operative position. A plunger 64 fits slidably within the bore and normally projects from the lower end of the housing 56 as shown in solid lines in FIG. 5. The plunger 64 is biased downwardly by a helical compression spring 68 acting between the plunger and an upper end wall of the housing 56. The spring 68 surrounds a shaft 70 joined to the plunger and extending through a hole 72 drilled in the upper end face of the housing 56. When the rear frame section 16 is in its operative position, the plunger 64 of each latching device engages in a hole 74 drilled through the corresponding latch member 52 on the rear cross-bar 38, so that the rear section is held securely in position. The edge 76 of each latch member 52 and the associated plunger 64 are correspondingly bevelled, so that on moving the latch member into engagement with the plunger the latter is lifted by the latch member until its springs into engagement in the hole 74 in the latch member, the latching device thus being self-locking. Fixed to each plunger 64 is a rod 78 extending outwardly through a slot 80 in the side wall of the housing 56 of the latching device (see FIG. 6, in which the plunger has been omitted for clarity). The slot 80 is of an inverted L-shape, the ends of the upright part of the slot limiting axial movement of the plunger, and the transverse part of the slot enabling the latching device to be maintained in a unlatched condition when the plunger is lifted by hand by means of the rod 78 to the position shown by broken lines in FIG. 5 and the rod 78 is then turned about the axis of the plunger to engage the transverse section of the slot 80.

The horizontally disposed portion of the front frame section 14 support a shield portion 82 of perforated sheet metal, the shield portion being welded to the horizontal portions 24 of the bars 18 and to the cross-bar 26 and strut 28. A further shield portion 84 of perforated sheet metal is fixed to the horizontally disposed portion of the rear frame section 16, the shield portion 84 being welded to the horizontal portions 36 of the bars 30, and to the cross-bar 38 and strut 40. The size and arrangement of the perforations in the sheet metal are such as to allow the driver of the truck seated on the driving seat 10 to see clearly through the sheet whilst not excessively reducing the strength of the sheet. The shield portions 82 and 84 are so mounted on the frame sections 14 and 16 that when the rear section 16 is in its operative position they form a shield positioned to protect the driver of the truck from objects falling, for example from the forks of the truck or from pallet stacks.

Movement of the rear frame section 16 away from its operative position on release of the latching devices 54 is limited by means of a folding bar 90 (see FIG. 1) hinged near its mid-point and pivotally connected at its ends 92 and 94 to respective frame parts 14 and 16 near the ends of their cross-bars 26 and 38. The arrangement is such that when the rear frame section 16 is in its operative position the bar 90 is folded and lies against the shield portion 84 of the rear section as shown in FIG. 1, whilst when the rear section 16 is moved away from the front section 14 to the position shown in broken lines in FIG. 2 the bar 90 is unfolded and straightened out, the length of the bar 90 allowing sufficient movement of the rear section 16 to enable a hoist to be lowered from above between the front and rear frame sections in order to lift the truck battery from its casing 8.

In operation of the guard, to remove the truck battery from the truck the latching devices 54 are released and the rear frame section 16 is swung rearwardly about its hinged connection to the truck body 2. The lid 12 of the battery casing 8 is removed and a hoist is lowered from above between the front and rear frame sections 14 and 16 to lift the battery clear of its casing. The battery is then moved away from the side of the truck remote from the folding bar device 90 of the guard.

If, when the rear frame section 16 is in its operative position, a downwardly directed load is applied to the shields 82, 84 of the guard, the rear frame section 16 will be urged to pivot about its hinged connections 32, 44 to the truck, towards the front frame section, so that pressure of engagement between the half-cylindrical hook members 50 of the rear section 16 and the cross-bar 26 of the front section 14 will increase and the stability of the structure will tend to increase.

It will be appreciated that many modifications could be made in the described embodiment. For instance, the latching devices described could be replaced by other and well known forms of releasable connection. The folding bar device could be replaced by a straight rod slidably engaging two sleeves rotatably connected to the sides of respective frame parts near their cross-bars, the rod having stops at each end which engage respective sleeves when the rear frame section is swung away from the front frame section, thereby to limit the movement of the rear section. Alternatively, a chain of suitable length connected at its ends to the frame sections could be provided, or the device could be dispensed with altogether, the rear frame section being lowered to the ground when the battery is to be removed.

Instead of front and rear frame sections, two frame sections could be provided which were adapted for hinged connection to respective opposite sides of the truck. In that case the battery, after having been lifted from its casing, would be removed rearwardly from the truck.

I claim:

1. A canopy guard for a battery powered forklift truck, comprising a shield supported, in use, over the truck driver's position on a frame fixed to the truck at respective spaced locations thereof, in which the guard comprises two frame parts, each including a shield portion one side of which is disposed at one end of the frame part and, when the guard is in an operative position on the truck, is opposed to a corresponding side of the shield portion of the other frame part, the two shield portions then forming the shield of the guard, each frame part being connected at its end remote from the shield portion to the truck and at the said one end for releasable interlocking to the other frame part when the guard is in its operative position, one of the frame parts being hingedly connected at or near the end remote from the shield portion to one end of the truck, so that, upon release of the interlocking connection between the frame parts the hinged frame part can be swung away manually from the other frame part to a position in which an overhead hoist can be lowered between the shield portions of the frame parts to allow of removal of the battery from the truck by means of the overhead hoist.

2. A canopy guard as claimed in claim 1, in which the frame parts are so adapted that when the guard is in its operative position, a downwardly directed load applied to the shield of the guard will urge the hinged frame part towards the other frame part.

3. A canopy guard as claimed in claim 1, in which there is provided a device to limit the extent of movement of the hinged frame part away from the other frame part and to hold the hinged frame part in position when it has been swung away from the other frame part to the limited extent, the extent of movement allowed being sufficient to allow of removal of the battery from the truck.

4. A canopy guard as claimed in claim 3, in which the device comprises a folding bar pivotally connected at its ends to respective frame parts, the bar lying folded against the guard when the guard is in its operative position and opening out to its fullest extent when the hinged frame part is swung away from the other frame part to the limited extent.

5. A canopy guard as claimed in claim 1, in which one frame part is fixed to the truck near its forward end and the other frame part is pivotally connected to the truck near its rear end so that it can be swung away from the fixed frame part about an axis which is horizontal and perpendicular to the normal line of movement of the truck.

6. A canopy guard as claimed in claim 5, in which the frame part connected to the truck is provided at said one end thereof with one or more hook members which, when the guard is in its operative position, hook over a transverse member of the fixed frame part so as to support the pivotally connected frame part.

7. A canopy guard as claimed in claim 1, in which the frame parts are provided with co-operating parts of latching means which, when the guard is in its operative position, serve to maintain the two frame parts in releasable interlocking connection.

8. A canopy guard as claimed in claim 7, in which the latching means is adapted to be self-locking when, in use, the hinged frame part is swung into interlocking connection with the other frame part.

References Cited

UNITED STATES PATENTS 3,289,871   12/1966   La Tourneau.

FOREIGN PATENTS 541,949   6/1957   Canada.

LEO FRIAGLIA, Primary Examiner

R. R. SONG, Assistant Examiner

U.S. Cl. X.R.

280—150